United States Patent [19]
Wiegand

[11] Patent Number: 5,074,702
[45] Date of Patent: Dec. 24, 1991

[54] SELF-ALIGNING SECTION CONNECTING SYSTEM

[76] Inventor: Gregory P. Wiegand, 1758 Jacobson Rd. NE., Poulsbo, Wash. 98370

[21] Appl. No.: 470,984

[22] Filed: Jan. 26, 1990

[51] Int. Cl.⁵ ............................................. B25G 3/00
[52] U.S. Cl. .................................. 403/316; 403/14; 403/21
[58] Field of Search ................ 403/13, 14, 21, 316

[56] References Cited

U.S. PATENT DOCUMENTS

| | | | |
|---|---|---|---|
| 2,361,706 | 10/1944 | Pavlecka et al. | 403/21 |
| 3,787,125 | 1/1974 | Traut et al. | 403/13 |
| 4,232,497 | 11/1980 | Meschnig | 403/14 X |

Primary Examiner—Andrew V. Kundrat

[57] ABSTRACT

A self-aligning connecting system for connecting structural sections (10), the system having at least one pair of connector halves (20), each pair (20) comprising a male half (30) attached at one end of a truss section (10b) and a female half (70) attached at an opposing end of an adjoining truss section (10a). Male half (30) comprises a floating peg (42) within slot (39) which engages a bore (79) located on female half (70). Opposing ends of two truss sections (10a & 10b) are then joined together by inserting the peg (42) of each male half (30) into the corresponding bore (79) of each female half (70). Lock pin (97) then engages each peg (42) in chamber (50) to connect the truss sections. Truss sections (10a & 10b) are thereafter quickly and easily disassembled and reassembled by simply removing and replacing each lock pin (97).

18 Claims, 4 Drawing Sheets

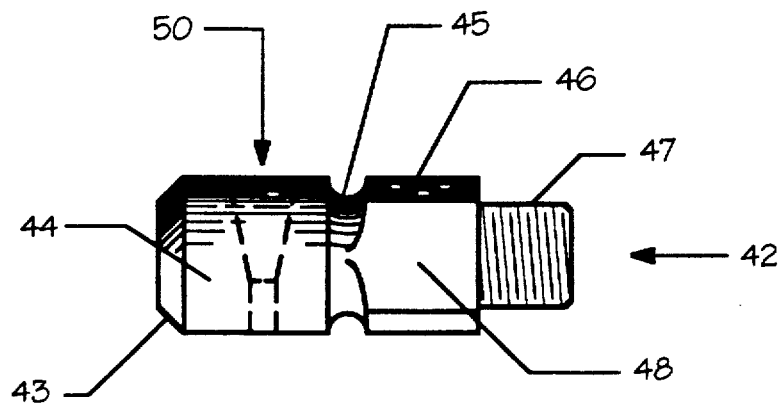
FIG.4
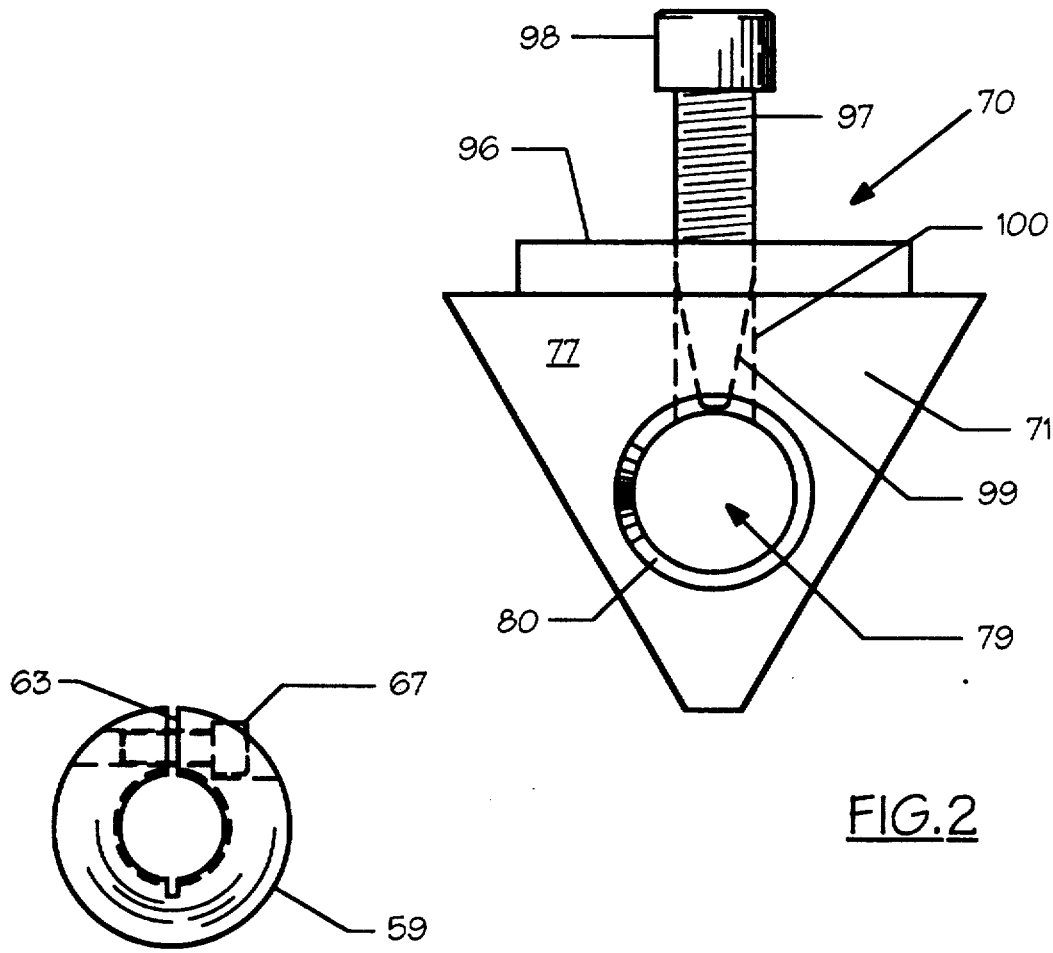
FIG.2
FIG.6

SELF-ALIGNING SECTION CONNECTING SYSTEM

TECHNICAL FIELD

This invention relates to connecting systems, particularly to a self-aligning connecting system for quickly connecting together the ends of two adjoining structural sections, and more particularly to a connecting system for banklight truss sections.

BACKGROUND OF THE INVENTION

In the lighting industry, frames for banklights (sometimes called softlights) which are used to illuminate large objects for photography or display purposes, are often constructed of large truss structures. These truss structures, which are generally much larger than other types of lighting fixtures, as well as trusses used in the entertainment side of the lighting industry, are advantageously built by connecting the ends of smaller, more portable, truss sections together. Due to their large size and weight, these truss structures must be transported either partially or completely disassembled into their smaller truss section components and then reassembled at every job site. A similar problem is faced wherever structural sections must frequently be assembled, disassembled for transport, and then reassembled. During the assembly process the ends of the adjoining truss sections must be properly aligned and connected. Typically, this process requires the meticulous alignment of holes located on the mating ends of each respective adjoining section, and the insertion of bolt connectors, or the like, which can be troublesome and time consuming at best. Under less than favorable circumstances, misalignment of holes, due to differences in dimensional tolerances from one section to another, or due to slight deformation of section ends from harsh handling in transport, can further complicate and prolong assembly time. It is not uncommon for assembly and take down of the frame structure alone for a large banklight to take many hours, while the rest of a film production crew stand idle. This kind of delay can be inordinately expensive. Furthermore, when the job has ended, the truss section must be again disassembled, transported, and then reassembled at the next job site.

What is needed is a connecting system that permits quickly, easily, and reliably connecting the ends of truss sections together with self-aligning pegs for quicker first time assembly.

DISCLOSURE OF THE INVENTION

The present invention as it pertains to connecting structural sections will be described in the context of connecting truss structures used in the lighting industry. However it will be appreciated that the invention will have wide application with respect to structures used in other industries.

It is a general object of the invention to provide a connecting system which can be easily, quickly, and repeatedly used to connect the ends of structural sections together.

It is another object of the invention to provide a connecting system which is self-aligning.

It is a still further object of the invention to provide a connecting system having the above stated characteristics that is both easy and economical to manufacture, yet structurally sound.

These and other objects of the invention which will become apparent are accomplished by the means, and in the manner, described below. The invention is a self-aligning connecting system used to connect together the ends of two structural sections, such as two lighting truss sections. The apparatus of the invention comprises at least one pair of connector halves, each pair having a male half, a female half, and a connector lock to releasably lock two halves together. Each connector half is attached to respective mating ends of the two structural sections. Each male half has a slot in its base and a floating peg. The peg has a peg shank which is slidably engaged within the slot, and which can float, when it is not otherwise locked in place, in either of the two opposing directions along the transverse slot access. Peg shank and slot cooperate so that the floating peg is essentially not rotatable in the slot. Alternatively, other anti-rotation means may be employed. The peg has a rear thrust surface and a lock nut to pretension the peg and to retain it in the slot when connection halves are not joined. Peg and slot also cooperate to bias the float of the peg toward the center of the slot.

Each female half has a chamfered bore in its base for receiving the head of the peg from the male half. The shape of the bore and the male peg head are preferably complimentary. Preferred embodiments of the invention will have round pegs in the male half and cylindrically shaped bores in the female half, with the peg and bore complimentarily dimensioned for an easy sliding fit. Preferred embodiments will also have a roughly rectangularly shaped slot which passes right through the male base along a longitudinal axis which is perpendicular to the base. The transverse axis of this slot runs in the direction of the longest dimension of this approximately rectangular shape.

Preferred embodiments of the apparatus will employ multiple pairs of connector halves wherever two structural sections are to be joined together. For instance, where the structural sections are themselves triangularly cross-sectioned truss members, as is preferred in the inventor's own banklights, a male half can be located at each of the triangular vertices on one end of the truss member, and three female halves can be located one at each of the triangular vertices on the other end of the truss member. Square cross-sectional trusses would employ four each of the male and female halves. Each truss member would then have a male end and a female end, and truss members would be joined male end to female end by joining male connector halves to female connector halves. Using multiple connector halves serves to increase the rigidity of the resulting structure, yet results in no substantial joining problems typically associated with multiple alignment points in conventional structural joining because the invention is self-aligning.

Preferably, each male half is assembled in a jig before it is mounted on its truss section end. However, this phase can also be done "in the field," with some loss in efficiency on first time use, using the already mounted female halves as "jigs." In any case, the jig is identical to a female half anyway. The procedure is as follows: insert male peg head into female bore until peg chamber is approximately aligned below the female half's lock pin; tighten down lock pin to hold peg head in bore; torque lock nut to generate within 10-20% of anticipated working load (in one case, working load is approximately 6,000 pounds) in the peg; lock locknut and withdraw lock pin. The male half is thus preassembled with the peg pretensioned for field assembly, and the distance between the centerline of the peg chamber and the back of the male base preset so that the peg may readily be joined to any female half.

During field assembly for any two particular structural sections, a male end is moved opposedly toward a female end of another section and a fit made between the single or multiple pegs on the male end with the corresponding bores on the female end. Of course, this is done visually with the vertices of the respective male and female sections more or less already visually aligned. Any small misalignments of pegs with respective bores are then self-corrected as the tapered bore guides the floating peg slightly in one of the two opposed transverse directions within its respective slot in which it is free to move into alignment with its respective bore.

Preferred embodiments of the invention will have all of the transverse slot axes of the male base slots so aligned as to intersect substantially on or near the longitudinal centerline of the structural member. Preferably, where a centerline can be geometrically determined for a given structural member, the multiple transverse slot axes will be aligned to intersect on that centerline. However, exact alignment, or exact intersection, of multiple axes is not required for utility of the invention. In practice, deviation of the intersection point of the axes from the centerline by as much as 2% of the length of a side of a truss section cross-section (i.e. approximately 0.44 inches for triangular truss cross-section that is 22 inches on a side). It has been found that this orientation of the transverse slot axes toward the centerline of the structural member most advantageously facilitates the easy self-alignment of the pegs with their respective bores, while at the same time maintaining, after the pegs are locked within the bores, the greatest amount of structural determination and integrity of the connected truss sections.

As indicated just above, after the pegs have self-aligned themselves and slipped into their respective bores to bring the respective two structural sections together, a connector lock is employed for each male and female half to load the peg to full tension and to lock the peg within the bore and prevent the peg from movement along the peg axes either further into or out of the bore. This also preloads the joint to reduce movement when loaded.

A number of different devices, or configurations, can be employed to serve this connector lock function. Preferably a lock pin is inserted through a portion of the female base and into a chamber in the peg head. However, any other releasable device which can lock a pin or a shaft from axially movement now known or later developed will also serve. Preferably, the peg head has a conically shaped chamber into which is tightened, through a threaded aperture in the female base, a threaded lock pin having a reciprocally and complimentary conically shaped tip. The interengagement of the conical lock pin tip into the conical bore provides a mechanical leverage to pull the peg into full load tension, and to also thereafter prevent the peg from having any further "float." Preferably as well, the orientation of the axes of this conical chamber in the peg head and the threaded aperture in the female base, are both normal to the axis of the peg head. Alternatively, other axial orientations may be employed, and a useful chamber in the peg head can also be a tapered circumferential groove which is engaged by the tapered lock pin head.

Where the above preferred form of lock pin and chamber shape are employed it is preferable that the peg shank have, as its antirotation means, at least one flattened face such that the shank may not be substantially rotated in its slot. Otherwise, there would be difficulty each time with achieving an alignment of the threaded lock pin and the conical peg head chamber.

During the "jig" phase of use of the male half (or alternatively in the field where the male half has been rebuilt or for other reasons disassembled and reassembled), threaded portion of the peg shank protrudes beyond the rear face of the male base and has threaded on to that threaded shank portion either a conventional lock nut with a washer as appropriate, or a split and threaded lock ring, commonly referred to in the industry as a shaft collar. This split lock ring is turned for tightening as would be an ordinary threaded collar onto the threaded protruding portion of the peg shank and then an allen bolt is used to span the split portion of the collar and to tighten it upon the threaded portion of the shank. This locking collar provides a large bearing surface for the structural load, and also serves to keep the peg perpendicular to the male base. The locking collar is large enough in diameter to be greater than the longest slot dimensions, and this also helps to keep foreign matter out of the rear end of the slot. Also, the rear portion of the peg head itself is either greater in diameter than the peg shank or, as in preferred embodiments, there is a portion of the peg head which is greater in diameter than the "flattened" peg shank.

In any case, tightening of the lock nut or lock collar at the back of the male base pulls the shoulder of the peg head toward the front of the male base and tends to center the peg in position upon the transverse axis in the slot, even when male and female halves are not joined. This centering helps in the self-aligning of truss members fitted with this connector system. A preferred and improved version of this design employs a chamfered, or recessed, slot opening on the front face of the male base and preferably a compressible o-ring around the shank of the peg between the peg head shoulder and the male base. In this arrangement, tightening of the lock nut pulls the shoulder toward the seat in the base and compresses at least a portion of the o-ring. Use of the o-ring also permits greater machining tolerance in dimensioning the male and female base thicknesses. The o-ring also seals the front opening of the male base slot and prevents build up of foreign matter in the slot.

The method of the invention comprises the steps of pretensioning a floating male peg in a slotted male base so that the peg is biased toward a center position in the slot; sliding the pretensioned male peg head into a corresponding bore in a female base; locking the male and female bases together by inserting a locking pin through a portion of the female base and into female peg head.

BRIEF DESCRIPTION OF THE DRAWINGS

FIG. 2 is a front elevation of the female connector halve from FIG. 1.

FIG. 4 is a side elevation of the floating peg from FIG. 3.

FIG. 6 is a front elevation of the lock in collar from FIG. 3.

BEST MODE OF CARRYING OUT THE INVENTION

Figure 1:
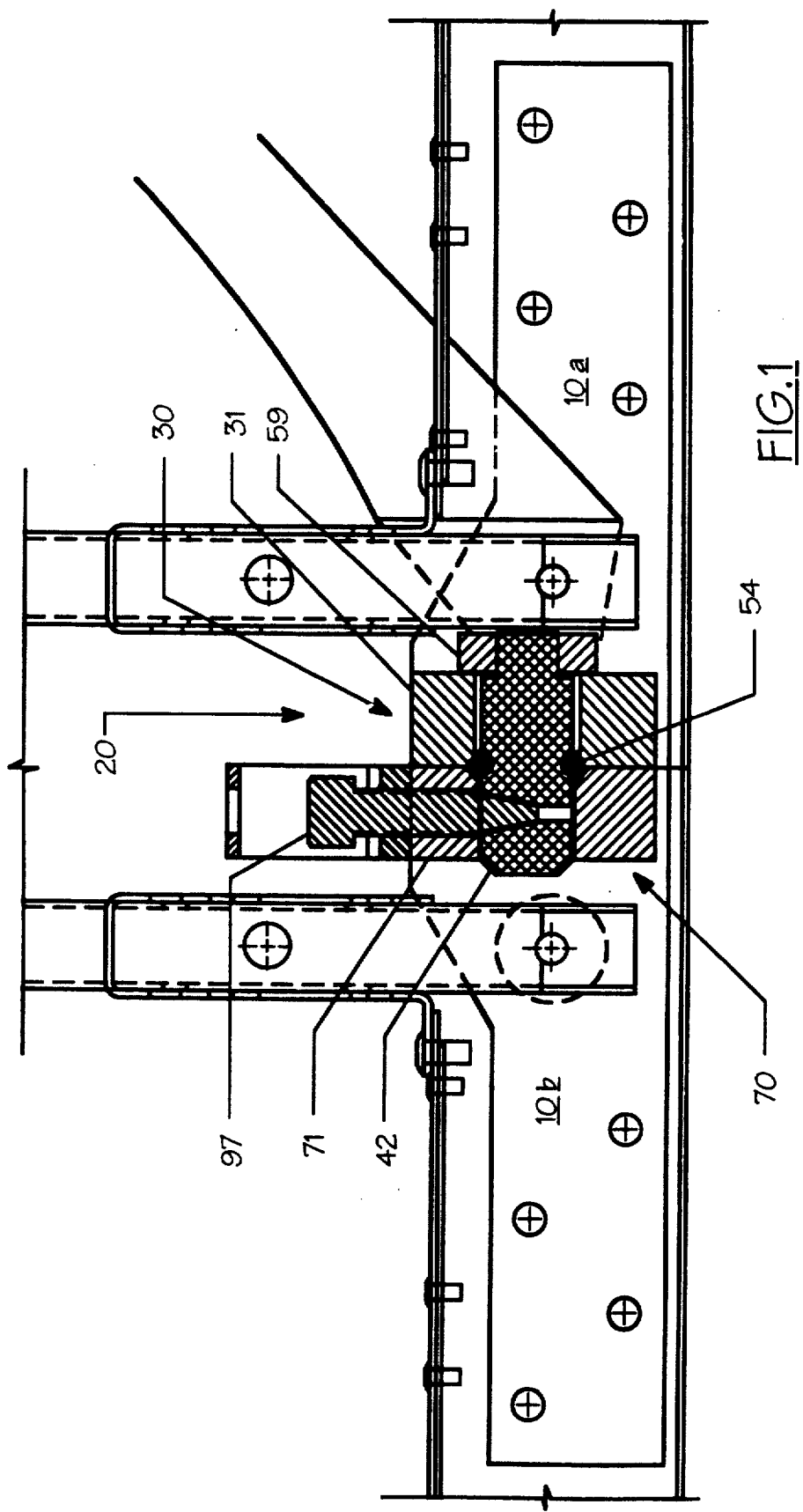
FIG. 1 is a side sectional view taken through the middle of the joined male and female connector halves of the invention shown disposed within respective ends of partially drawn truss sections.
Figure 7:
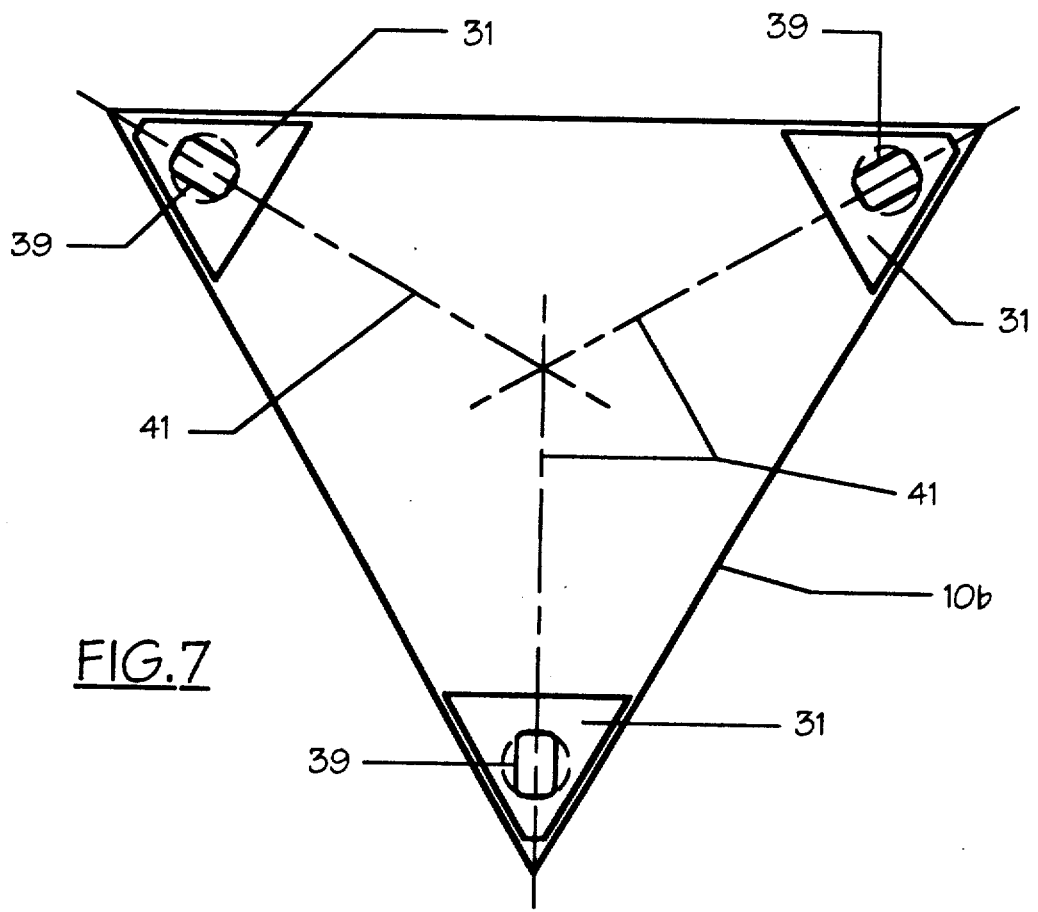
FIG. 7 is a schematic end view of a typical structural section illustrating transverse axes intersections at the centerline of the structural section.

Referring now to the drawings wherein like numbers indicate like parts, the invention is illustrated by reference to specific embodiments. FIG. 1 is a side elevational section of the joint formed by connector pair 20 which is comprised of male half 30 and female half 70. Portions of the two mating ends of the two structural sections 10a and 10b are also partially drawn to illustrate the preferred positioning of the connector halves at the ends of the structural sections. Connector halves 30 and 70 may be attached to their respective structural section ends by a number of different means, as will be appreciated by those skilled in the art. The inventor has found, when using the invention to connect truss section which are triangular in cross section, that male base 31 and female base 71 are most advantageously triangularly shaped themselves. In this configuration it is a relatively simple matter to attach male half 30 to section 10a by means of flat head machine bolts passing through a portion of the webbing of section 10a and into threaded bores (not shown) in male base 31. Similar attachment means are also employed for female half 70 in section 10b. Also the positioning of the connector pair 20 in FIG. 1 is typical for the positioning of all other connector pairs, where more than one pair is employed. As schematically illustrated in FIG. 7, three connector pairs per section joint are preferred for triangular trusses; and the preferred location of the connector pairs are at the respective vertices of the triangular cross section of the truss sections. Square, or "box", trusses will benefit from four pairs of connectors.

FIGS. 1, 3, 4, 5, and 6 best illustrate male half 30. In the drawing figures indicated, male half 30 is comprised of male base 31, floating peg 42, o-ring 54, and locking collar 59. Male base 31 has a slot 39 passing from base front 37 through to base rear 38. Slot 39 is preferably substantially rectangular shaped and dimensioned along the transverse axis 41 of slot 39 so that it is approximately 0.06 inches longer than the diameter of peg shank 46. Slot 39 is preferably not more than 0.020 inches (0.010 is best) wider than the distance between slot faces 48. Thus peg shank 46 is free to "float", when not otherwise locked as will be further described below, by a distance back and forth along transverse axis 41 of 0.06 inches. This small tolerance has proven to be adequate in numerous trial truss section assemblies for taking advantage of the self-aligning features of the connecting system of the invention. The preferred slot width also sufficiently limits rotational, horizontal, and vertical movement of the trusses relative to each other so that dimensional stability and integrity of the overall truss framework is adequately maintained.

An alternative to use of o-ring 54 as a compressable centering means which still allows float of peg 42 in slot 39 is to employ a flat washer between shoulder 45 (with shoulder 45 appropriately modified to receive such a washer) and base 31, where the washer serves primarily to keep debris out of slot 39, and a spring system positioned along or parallel to transverse axis 41. A pair of recesses above and below slot 39 with detent springs and balls will serve adequately as a spring system, although other compressible systems for accomplishing the same purpose will readily occur to those skilled in the art.

Floating peg 42 has a head 44 on the front end of which is a taper 43, a conical chamber 50 in head 44, a shoulder 45 on the rear of head 44, a shank 46 and a threaded tail 47. Shank 46 has two flattened shank faces 48, so that in the direction of the transverse axes 41 shank 46 is substantially the same diameter as head 44, but in the perpendicular direction (the direction of the width of slot 39) shank 46 is substantially narrower than head 44. The fit between the long walls of slot 39 and shank faces 48 is determined by the preferred maximum spacing of 0.02 inches total clearance between shank faces 48 and the respective walls of slot 39. As with the degree of peg "float" disclosed above, this clearance is cumulative when two or more connector half pairs are employed across a section joint, yet when the joints are locked together, this clearance has been found to be effective in limiting rotational, horizontal, and vertical movement of the trusses relative to each other while at the same time allowing rapid and easy assembly of the connector halves.

Male half 30 is assembled by sliding o-ring 54 onto peg 42 so that it nests against shoulder 45. Peg 42 is then inserted tail 47 first into male base 31 from the base front 37 into slot 39, so that tail 47 protrudes beyond base rear 38. Locking collar 59 is then threaded onto tail 47 so that peg 42 retains its ability to "float" within slot 39, but is not otherwise wobbly or loose.

Figure 3:
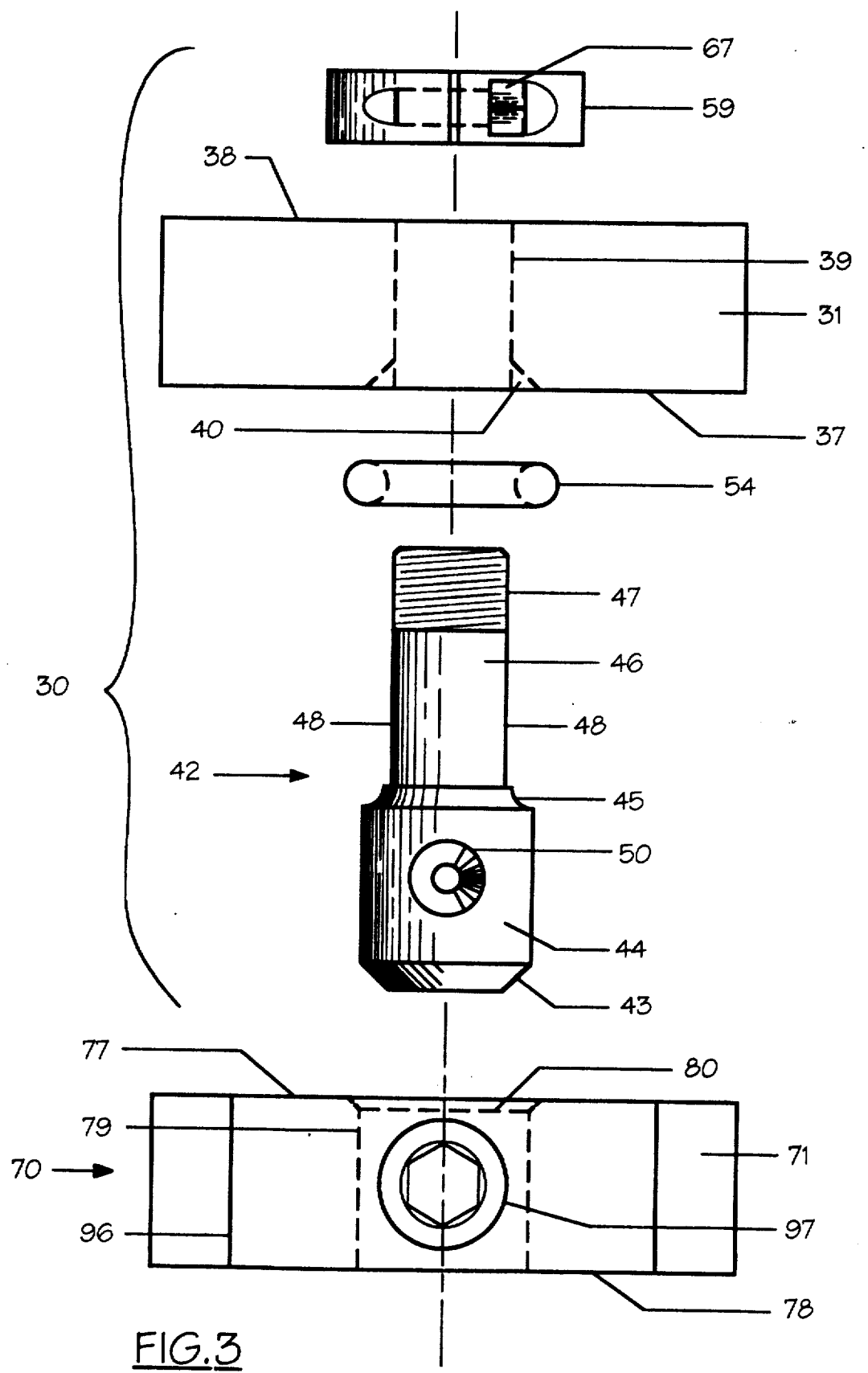
FIG. 3 is an exploded plan view of the male connector half from FIG. 1.
Figure 5:
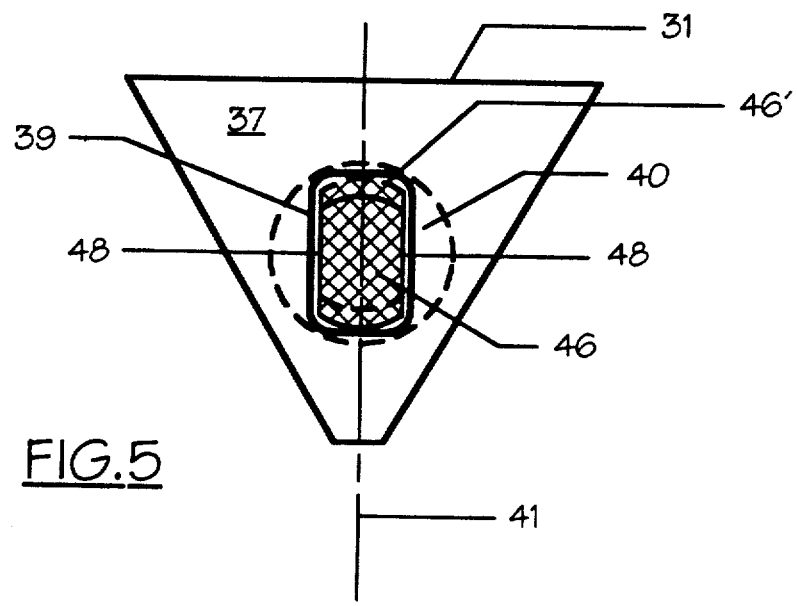
FIG. 5 is a schematic front elevation of the male base from FIG. 3 with the position the peg shank sectionally illustrated.

Female half 70 is best illustrated in FIGS. 1, 2, and 3. Female half 70 is comprised of female base 71 which has passing perpendicularly therethrough a main bore 79 on the front end of which is a chamfer 80. Main bore 79 passes perpendicularly through female base 71 from the base front 77 through to the base rear 78. Lock pin 97 is threaded into lock pin bore 100 in nylon block 96 and female base 71. Lock pin 97 is turned by means of head 98 to tighten lock pin 97 downward into bore 100 so that lock pin tip 99 penetrates into bore 79. In preferred embodiments lock pin 97 is a standard threaded allen bolt with a conically shaped tip, and chamber 50 in peg head 44 has a complimentary and reciprocally conical shape for receiving tip 99. Nylon block 96 tends to "grip" pin 97 like a common NYLOCK TM nut to prevent pin 97 from loosening or falling out from vibration. Block 96 also serves as starting threads for bore 100 when pin 97 is fully withdrawn from protrusion into bore 79. Alternatively, female base could be made taller instead of using block 96.

Assembly of male half 30 is completed as follows. Peg head 44 is then inserted into a jig (not shown) which is essentially the same as a female half, except that it is bench mounted (parts of the jig will therefore be called out as if referring to female half 70. Lock pin 97 is tightened down securely into chamber 50. Then collar 59 is torqued bringing the male and female bases together and preload peg 42 as described above. Because shoulder 45 is pulled against the compressive resistance of o-ring 54 toward seat 40 in male base 31 when locking collar 59 is tight, peg 42 tends to stay centered in slot 39. After torquing lock collar 59, standard threaded allen bolt is 67 is tightened to slightly compress slot 63 in locking collar 59 to thereby lock collar 59 onto tail 47. The combination of the locking effect of collar 59 and the natural expansive tension of compressed o-ring 54 exerting a force against both seat 40 and shoulder 45 creates a very effective frictional lock which holds peg 42 relatively fixed in its position in slot 39, except that it can still be slightly tilted, or float, to self-align with bore 79. Lock pin 97 is then released and the assembled male half is withdrawn.

The connecting system of the invention works as follows: when two structural sections (as for instance 10b and 10a) are to be joined together and have therein respectively already installed female half 70 and male half 30 (or a plurality of such halves), the section ends are brought near to one another and the peg heads 44 are visually aligned with bores 79. The taper 43 of head 44 is pressed against the chamfer 80 of bore 79, for all connector pairs involved in the joining operation, so that floating pegs 42 are urged to slip into bores 79, each floating peg 40 being free to travel, or "float", slightly along the transverse axis of respective slots 39. As will be appreciated from FIG. 5, peg shank 46 in slot 39 can move from the position illustrated to the position shown o in broken lines at 46' in order to accomplish the necessary fit of all floating pegs 42 into all bores 79.

Flat shank faces 48 within slot 39 prevent any substantial rotation of peg 42 within slot 39; therefore chamber 50 will very nearly become aligned with locking pin 97 as peg 42 is fully inserted into bore 79. Any slight difference in alignment of chamber 50 and tip 99 is remedied as pin 97 is tightened downwardly into chamber 50. As pin 97 becomes tight, peg 42 is pulled to the fullest extent into bore 79, and with it comes male base 71 and the rest of section 10a. Also a result of tightening pin 97, peg 42 is pressed against the wall of bore 79 opposite pin 97, thereby forcing peg 42 to remain perpendicularly fixed relative to female base 71. This helps to achieve symmetrical loading of peg 42 and collar 59 when under tension.

Disassembly, and then subsequent reassembly, of these particular two sections 10a and 10b can then be accomplished simply by loosening lock pin 97 until tip 99 is withdrawn from chamber 50. Peg 42 is then free to be withdrawn from bore 79, and the two sections can come apart.

FIG. 7 also illustrates the preferred orientation of multiple transverse slot axes 41. Preferably, each transverse axis 41 of each slot 39 is oriented on its structural section (such as 10b) so that all transverse axes intersect at or near the center line of section 10b.

Alignment of axes is substantially the same for square or rectangular trusses. Having the axes of slots 39 thus in non-parallel alignment prevents lateral and rotational displacement of one truss end with respect to its mating truss end, except to the extent permitted by the above described side play in each slot 39. Since slot side play tolerances will have a cumulative effect, the clearance between slot 39 walls and shank faces 48 should be kept to a minimum consistent with maintaining functional aligning movement of peg 42 in slot 39 along transverse axis 41.

The connecting system is fabricated of steel and aluminum for minimum weight, and those skilled in the art will be able to select appropriate materials. Peg 42 is preferably made of 7075T6 aluminum, and collar 59, male base 31 and female base 71 of 2024 T3511 aluminum. Lock pin 97 is made of 17-4 PH 900 stainless steel. Preferred o-rings from Parker O-ring Compounds are model number S604-70 made of silicone rubber.

As an alternative to the threaded lock pin 97 for pulling and holding connecter halves together, a DeStaco type clamp (not shown) from DeStaco, 250 Park Street, Troy, Mich. 48007, such as model 602 or 604, may be employed. It is contemplated that this type of clamp could be integrally mounted in association with female base 70, so that the plunger portion of the clamps would take the place of lock pin 97.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications with the legitimate and valid scope of the appended claims, appropriately interpreted in accordance with the doctrine of equivalents.

INDUSTRIAL APPLICABILITY

This invention will find use in all industries where structural sections are frequently assembled and disassembled, such as for instance scaffolding or rigging structures. Also in the lighting industry banklight frames can be readily put together and taken apart in a fraction of the time required with conventional assembly and connecting systems. All parts of the connecting system are readily manufactured from commonly available materials, and the use of the connecting system will result in substantial savings of time and money over existing systems. Since there are no loose parts to assemble in the field, parts do not become lost, and there is little chance of substitution of improper materials.

I claim:

1. A connecting system for quickly connecting together two structural sections, the apparatus comprising:
   at least one pair of connectors halves, each pair having a male half, a female half, and a connector lock to releasably lock said halves together, each half connected to respective mating ends of said two structural sections;
   said male half having a slot in a base and a floating peg having a peg head and further having a peg shank slidably engaged within said slot to float in two opposing directions along a transverse slot axis;
   said female half having a chamfered bore in a base for receiving said peg head.

2. The apparatus of claim 1 wherein said connector lock further comprises (a) a lock pin and (b) a chamber in said peg head for receiving said lock pin, whereby said lock pin may be inserted into said chamber after said peg is received in said bore to prevent said peg from being withdrawn from said bore.

3. The apparatus of claim 2 wherein said lock pin is threadably engaged in the base of said female half.

4. The apparatus of claim 3 wherein said chamber, and that portion of said lock pin which engages said chamber, have reciprocal and complimentary tapers.

5. The apparatus of claim 4 wherein said peg shank has at least one flattened face such that said shank may not substantially rotate in said slot, and wherein said chamber is conically shaped and has an axis which can be aligned with an axis of said lock pin.

6. The apparatus of claim 1 further comprising a peg retainer for preventing said peg from being withdrawn from said male base.

7. The apparatus of claim 6 wherein said peg retainer comprises (a) a locking collar threadably engaged upon a threaded tail of said peg, and (b) a shoulder on the rear of said peg head which engages the male base when said locking collar is tight, said shoulder having a diameter greater than the width of said slot.

8. The apparatus of claim 7 further comprising a recessed seat in said male base which surrounds said slot, and a compressible o-ring around said peg between said shoulder and said seat, whereby tightening said lock nut pulls said shoulder toward said seat to compress at least a portion of said o-ring.

9. The apparatus of claim 1 wherein the forward end of said peg head is tapered.

10. A connecting system for quickly connecting together two structural sections, the apparatus comprising:
   at least one pair of connector halves, each pair having a male half and a female half, each half connected to respective mating ends of said two structural sections;
   said male half having a slot in a base, a floating peg having a peg shank slidably engaged within said slot to float in two opposing directions along a transverse axis and a generally cylindrically shaped peg head having a conical shaped chamber therein, and a threaded locking collar for threadably engaging a threaded tail on said peg;
   said female half having a chamfered bore in a base for receiving said peg head and a lock pin threadably engaged in a lock pin bore within said female base, said lock pin having a conically tapered tip for engaging said chamber in said peg head when said peg head is substantially fully inserted into said bore, said lock pin and chamber serving to releasably lock together said male half and said female half to prevent said peg from being withdrawn from said bore.

11. The apparatus of claim 1 wherein the number of said connector pairs is a plurality, and wherein the plurality of male halves are disposed on their end of the structural member such that their transverse slot axes all mutually intersect substantially at a centerline of said structural section.

12. The apparatus of claim 11 wherein said connector lock further comprises (a) a lock pin and (b) a chamber in said peg head for receiving said lock pin, whereby said lock pin may be inserted into said chamber after said peg is received in said bore to prevent said peg from being withdrawn from said bore.

13. The apparatus of claim 12 wherein said lock pin is threadably engaged in the base of said female half.

14. The apparatus of claim 13 wherein said chamber and that portion of said lock pin which engages said chamber have reciprocal and complimentary tapers.

15. The apparatus of claim 14 wherein said peg shank has at least one flattened face such that said shank may not substantially rotate in said slot, and wherein said chamber is conically shaped and has an axis which can be aligned with an axis of said lock pin.

16. The apparatus of claim 11 further comprising a peg retainer for preventing said peg from being withdrawn from said male base.

17. The apparatus of claim 16 wherein said peg retainer comprises (a) a locking collar threadably engaged upon a threaded tail of said peg, and (b) a shoulder on the rear of said peg head which engages the male base when said locking collar is tight, said shoulder having a diameter greater than the width of said slot.

18. The apparatus of claim 17 further comprising a recessed seat in said male base which surrounds said slot, and a compressible o-ring around said peg between said shoulder and said seat, whereby tightening said lock nut pulls said shoulder toward said seat to compress at least a portion of said o-ring.

* * * * *